United States Patent [19]
Porowski

[11] Patent Number: 5,196,160
[45] Date of Patent: Mar. 23, 1993

[54] NUCLEAR REACTOR HEAD AND PROCESS FOR OBTAINING SAME

[76] Inventor: Jan S. Porowski, 241 Curry Hollow Rd., Pittsburgh, Pa. 15236

[21] Appl. No.: 855,575

[22] Filed: Mar. 23, 1992

[51] Int. Cl.$^5$ ............................................... G21C 13/00
[52] U.S. Cl. .................................... 376/260; 376/292; 219/61
[58] Field of Search ............... 376/260, 292, 291, 293, 376/294, 203, 204, 307, 463; 219/61, 59.1, 60 R, 60.2; 228/119

[56] References Cited

U.S. PATENT DOCUMENTS

| | | | |
|---|---|---|---|
| 3,240,514 | 3/1966 | Bell | 376/463 |
| 3,607,629 | 9/1971 | Frisch | 376/260 |
| 3,907,636 | 9/1975 | Swart | 376/463 |
| 4,405,055 | 9/1983 | Koerdt et al. | 376/292 |

*Primary Examiner*—Daniel D. Wasil
*Attorney, Agent, or Firm*—Joseph J. Carducci

[57] ABSTRACT

A process for improving nozzles extending substantially vertically through openings in the head of a nuclear reactor and which are circumferentially welded to the head through a weld lying on an inner surface of the head and on the adjacent outer surface of the nozzle which comprises forming a coaxial, circumferential groove upwardly into at least a portion of the nozzle extending into the reactor and then filling the coaxial, circumferential groove with a weld material. The nuclear reactor head is also claimed.

12 Claims, 3 Drawing Sheets

NUCLEAR REACTOR HEAD AND PROCESS FOR OBTAINING SAME

BACKGROUND OF THE INVENTION

1. Field of the Invention

This invention relates to (1) a process for improving nozzles extending substantially vertically through openings in the head of a nuclear reactor and which are circumferentially welded to said head through a weld lying on an inner surface of said head and the outer surface of said nozzle immediately adjacent thereto which comprises forming a coaxial, circumferential groove extending upwardly into at least a portion of said nozzle extending into said reactor and thereafter filling said circumferential groove with a weld material and (2) to a nuclear reactor head carrying said nozzles.

2. Description of the Prior Art

Nuclear reactors are normally provided with a head having nozzles extending substantially vertically through openings therein and which are circumferentially welded to said head through a weld lying on an inner surface of said head and on the outer surface of said nozzle immediately adjacent thereto. These nozzles, generally made of an Inconel alloy, such as Inconel 600, provide for passage therethrough of control rod drive shafts attached to an exterior control rod drive mechanism. Tensile stresses generated from the weld holding the nozzle to the nuclear reactor head tend to facilitate stress crack formation in the inner surface of the nozzle in the vicinity of said weld. These cracks, in time, can extend upwardly into the body of the nozzle or into a portion of the weld, or both, into communication with the outer surface of the nozzle above the weld, into the space between the outer surface of the nozzle and the adjacent surface of the head opening, and then to the exterior of the reactor. Irradiated water can thus pass outwardly into the atmosphere, creating a serious pollution problem. If such cracks are circumferential, the nozzle can be detached from the reactor head by the pressure in the reactor, also with damaging results.

I have found that such problems in the nozzle arising from the formation of cracks therein can be obviated by forming a coaxial circumferential groove extending upwardly into at least a portion of the nozzle that extends into the reactor and then filling such circumferential groove with a weld material.

BRIEF DESCRIPTION OF THE INVENTION

Figure 1:
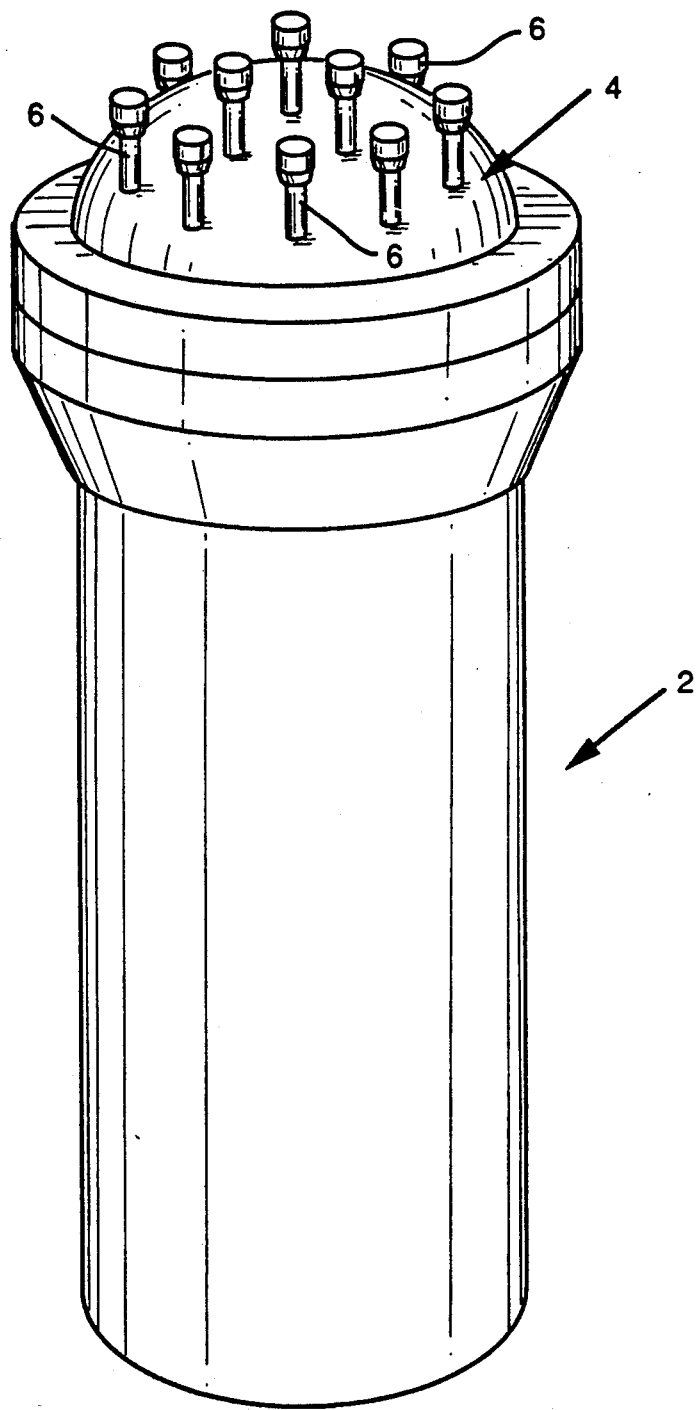
FIG. 1 is an isometric view of a nuclear pressure reactor having a head provided with nozzles extending vertically therein.

Referring to the drawings, reference 2 refers to a nuclear reactor pressure vessel provided with a head 4 having openings through which a number of nozzles 6 extend substantially vertically into the interior of said vessel 2.

Figure 2:
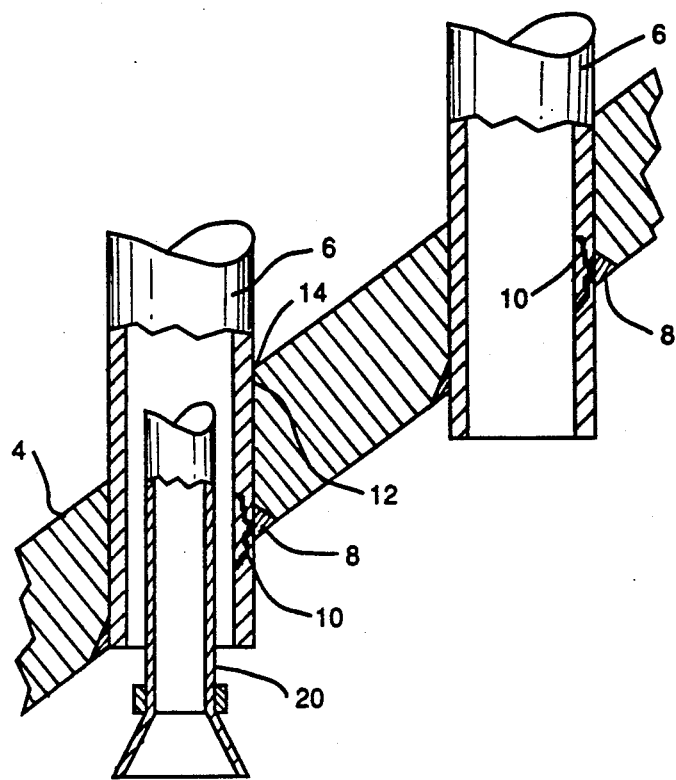
FIG. 2 is a side elevation view, party in section, of a portion of a nuclear reactor head showing two of the nozzles extending therethrough and welded thereto.

As shown in FIG. 2, each of nozzles 6 is normally circumferentially welded to head 4 through a weld 8 lying on the interior surface of head 4 and the outer surface of nozzle 6 immediately adjacent thereto. The corresponding outer adjacent surfaces of head 4 and nozzle 6 are normally not welded to each other. Since each of nozzles 6 is capped at an upper end thereof (not shown), and is circumferentially welded to head 4, pressurized hot water in the reactor interior is normally retained therein. However, the weld 8 tends to generate tensile stresses in the inner surface of the nozzle 6 in the vicinity of such weld, resulting in the formation of cracks 10 on said inner surface in the presence of the pressurized hot water. These cracks 10, which are generally longitudinal in direction, can move outwardly and upwardly in the nozzle bulk, into a portion of the weld or both. These cracks 10 as they move upwardly will grow and eventually can communicate with the outer surface of nozzle 6 above weld 8 so that pressurized water within the reactor can flow therethrough into the free space lying between the inner surface 12 of opening 14 in head 4 and the adjacent outer surface 16 of nozzle 6 into the atmosphere, creating serious pollution atmospheric problems.

Figure 3:
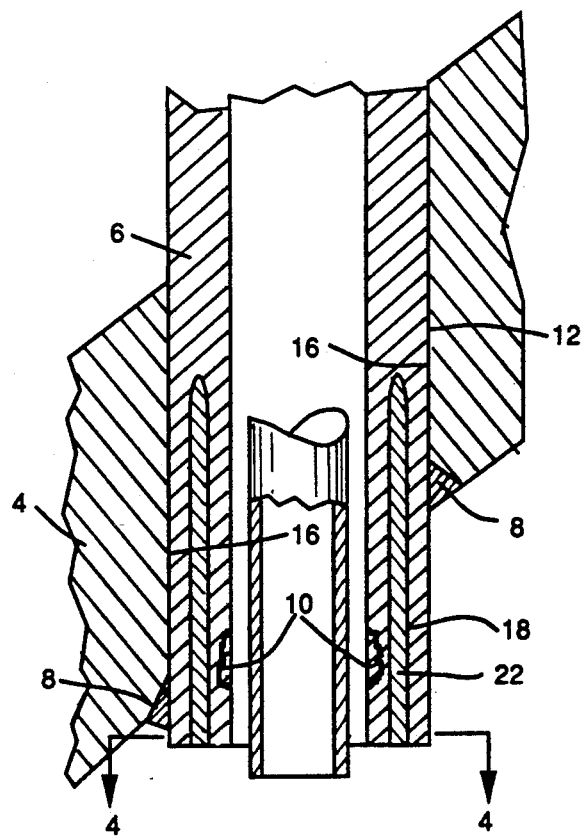
FIG. 3 is a side elevation view, partly in section, of a nuclear reactor head with a nozzle provided with a circumferential groove solely in the body thereof filled with a weld material.
Figure 4:
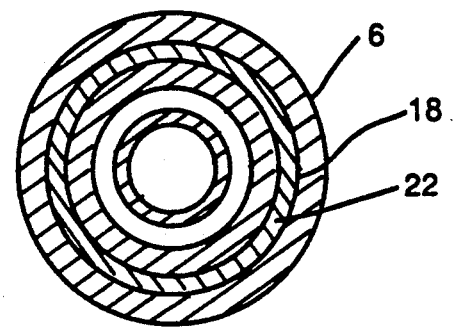
FIG. 4 is a section taken along the line 4—4 in FIG. 3.

The further propagation of such cracks in the nozzles and the possible resulting communication through such cracks of hot pressurized water from the interior of the nuclear reactor to the atmosphere can be inhibited in accordance with the invention defined and claimed herein. Referring to FIGS. 3 and 4 this can be done, for example, by forming a coaxial, circumferential groove 18 in nozzle 6 that extends upwardly into the bulk of nozzle 6 above the level of weld 8. In a preferred embodiment, the groove 18 extends at least about one-half inch above the highest level of weld 8, preferably about one-half to about one inch above the weld, the total height of the groove in the nozzle 6 being in the range of about one to about four inches. Additionally the groove 18 will similarly extend above any cracks present in the weld 8. The width of groove 18 will be in the range of about 3/32 to about ⅛ inch, preferably about ⅛ to about 3/16 inch, with reference to a nozzle 6 having an outer diameter of about 3 to about 5 inches and an inner diameter of about two to about 4½ inches.

The circumferential groove 18 can be made in any desired or conventional manner. For example, one way for creating the groove involves the use of an electrical discharge machine, such as shown in FIG. 13.4.11 in the Ninth Edition of Marks Standard Handbook for Mechanical Engineers by Avallone, et at. The presence of a protective thermal sleeve 20 (FIG. 2) will not adversely affect the procedure used to create groove 18. The weld material 22 used to fill circumferential groove 18 can be any weld material compatible with the metal used in the formation of nozzles 6, for example an Inconel-type metal alloy, such as Inconel-600, and the procedure used can be any conventional procedure capable of depositing a weld metal in a deep, narrow groove.

Figure 5:
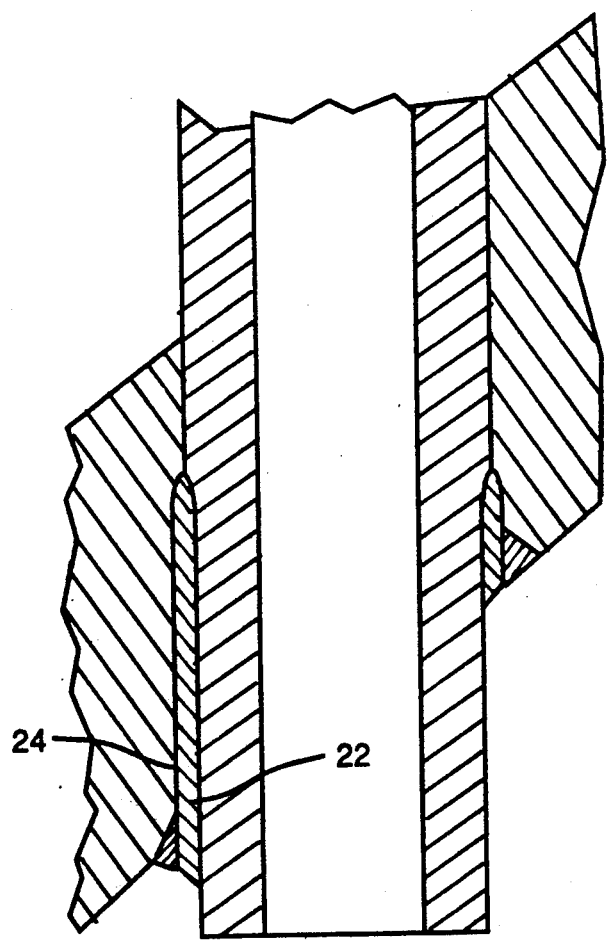
FIG. 5 is a side elevation view, partly in section, of a nuclear reactor head with a nozzle provided with a circumferential groove extending into the nozzle body and into the weld holding the nozzle to the reactor head filled with a weld material.

In the embodiment of FIG. 5, the circumferential weld 22 is one desired when some, or all, of the cracks 10 are found in weld 8. In such case the circumferential weld 22 extends upwardly into nozzle 6, through at least a portion of weld 8 and, in some cases, into head 4. The circumferential groove 24 is otherwise similar to circumferential groove 18, filled with weld material 22, and functions in a similar manner to inhibit flow of hot pressurized water from flowing through the defined cracks from the interior of the reactor to the atmosphere.

From the above, it can be seen that the weld material in the circumferential grooves 18 and 24 form a barrier that will interrupt communication of cracks between (1) the inner surface of the nozzle 6 adjacent to weld 8, (2) the bottom surface of the nozzle, (3) the outer surface of the nozzle below weld 8 and (4) the weld 8 with the outer surface of the nozzle extending outwardly above the weld 8. Therefore, leakage of hot pressurized water within the reactor space to the atmosphere is inhibited.

A specific embodiment herein can comprise a head 4, made of low alloy steel, such as SA-508, having a wall thickness of four inches and at least one opening therein having a diameter of four inches through which a nozzle 6, composed of Inconel 600, having an outer diameter of four inches and an inner diameter of three inches extends substantially vertically into the reactor space. The nozzle 6 is circumferentially welded to the head 4 through a weld 8, composed of Inconel 600, lying on an interior surface of head 4 and the outer surface of nozzle 6 immediately adjacent thereto. Within the core of nozzle 6 there is mounted a tubular protective sleeve made of stainless steel, for example of the type 316, having an outer diameter of 2.75 inches and an inner diameter of 2.5 inches. The nozzle 6 extends into the reactor space an average length of one inch and the protective thermal sleeve an average length of four inches. Using an electrical discharge machine, there is formed a coaxial, circumferential groove 18 as shown in FIGS. 3 and 4, having a recess with a width of 0.125 inch extending into the nozzle head approximately 0.75 inch above the level of weld 8. A weld material composed of Inconel 600 is then firmly and fully deposited within groove 18. Any cracks formed in the nozzle 6 adjacent weld 8 and/or in the weld 8 will thus be isolated and communication to the exterior surface of the nozzle 6 above weld 8 and with the atmosphere will be denied, because of the presence of weld material in circumferential groove 18.

Obviously, many modifications and variations of the invention, as hereinabove set forth, can be made without departing from the spout and scope thereof and, therefore, only such limitations should be imposed as are indicated in the appended claims.

I claim:

1. A process for improving nozzles extending substantially vertically through openings in the head of a nuclear reactor and which are circumferentially welded to said head through a weld lying on an inner surface of said head and the outer surface of said nozzle immediately adjacent thereto which comprises forming a coaxial, circumferential groove extending upwardly into at least a portion of at least one of said nozzles extending into said reactor and thereafter filling said circumferential groove with a weld material.

2. The process of claim 1 wherein said coaxial circumferential groove extends upwardly solely in the body of said nozzle.

3. The process of claim 1 wherein said coaxial, circumferential groove extends upwardly into a portion of said nozzle and a portion of said weld.

4. The process of claim 1 wherein said coaxial, circumferential groove extends upwardly into a portion of said nozzle, a portion of said weld and a portion of said head.

5. The process of claim 1 wherein said coaxial, circumferential groove extends upwardly beyond the level of said weld.

6. The process of claim 1 wherein said coaxial, circumferential groove extends upwardly beyond the level of cracks formed as a result of stress corrosion in the weld area.

7. In a nuclear reactor head in which nozzles extend substantially vertically through openings therein and in which said nozzles are welded to said nuclear reactor head through a weld lying on an inner face of said head and the outer surface of said nozzle immediately adjacent thereto, the improvement which comprises at least one nozzle having a coaxial, circumferential groove extending upwardly into at least a portion of said nozzle, said coaxial, circumferential groove being filled with a weld material.

8. The nuclear reactor head of claim 7 wherein said coaxial, circumferential groove in said at least one nozzle extends upwardly solely in the body of said nozzle.

9. The nuclear reactor head of claim 7 wherein said coaxial circumferential groove in said at least one nozzle extends upwardly into a portion of said nozzle and a portion of said weld.

10. The nuclear reactor head of claim 7 wherein said coaxial circumferential groove in said at least one nozzle extends upwardly into a portion of said nozzle, a portion of said weld and a portion of said head.

11. The nuclear reactor head of claim 7 wherein said coaxial, circumferential groove extends upwardly beyond the level of said weld.

12. The nuclear reactor head of claim 7 wherein said coaxial circumferential groove extends upwardly beyond the level of cracks formed as a result of stress corrosion in the weld area.

* * * * *